US00RE45942E

(19) United States
(12) Reissued Patent
Blakes et al.

(10) Patent Number: US RE45,942 E
(45) Date of Reissued Patent: Mar. 22, 2016

(54) SUPERCONDUCTING ELECTROMAGNETS COMPRISING COILS BONDED TO A SUPPORT STRUCTURE

(71) Applicants: Hugh Alexander Blakes, Oxfordshire (GB); Matthew John Longfield, Oxfordshire (GB); Patrick William Retz, Oxfordshire (GB)

(72) Inventors: Hugh Alexander Blakes, Oxfordshire (GB); Matthew John Longfield, Oxfordshire (GB); Patrick William Retz, Oxfordshire (GB)

(73) Assignee: Siemens PLC, Camberley (GB)

(21) Appl. No.: 14/533,739

(22) Filed: Nov. 5, 2014

Related U.S. Patent Documents

Reissue of:

(64) Patent No.: 8,306,589
Issued: Nov. 6, 2012
Appl. No.: 13/401,144
Filed: Feb. 21, 2012

(51) Int. Cl.
*H01F 1/00* (2006.01)
*H01F 6/06* (2006.01)
*H01F 6/02* (2006.01)

(52) U.S. Cl.
CPC ... *H01F 6/06* (2013.01); *H01F 6/02* (2013.01)

(58) Field of Classification Search
USPC ..... 505/211, 216
See application file for complete search history.

(56) References Cited

U.S. PATENT DOCUMENTS

| | | | | | |
|---|---|---|---|---|---|
| 4,467,303 | A * | 8/1984 | Laskaris | ..... | 335/216 |
| 4,896,128 | A * | 1/1990 | Wollan et al. | ..... | 335/299 |
| 5,731,939 | A * | 3/1998 | Gross et al. | ..... | 361/19 |
| 7,701,677 | B2 | 4/2010 | Schultz et al. | | |
| 8,943,676 | B2 | 2/2015 | Hutton et al. | | |
| 2004/0162222 | A1 * | 8/2004 | Markiewicz et al. | ..... | 505/211 |
| 2007/0247263 | A1 | 10/2007 | Calvert et al. | | |
| 2011/0005334 | A1 | 1/2011 | Haynes et al. | | |
| 2011/0012698 | A1 | 1/2011 | Hutton et al. | | |
| 2012/0149580 | A1 | 6/2012 | Hutton et al. | | |

FOREIGN PATENT DOCUMENTS

| | | | | | |
|---|---|---|---|---|---|
| CN | 101075497 | A | | 11/2007 | |
| GB | 2381388 | A | * | 4/2003 | ..... H01F 6/02 |
| GB | 2423871 | A | * | 9/2006 | |
| GB | 2437114 | A | | 10/2007 | |
| GB | 2456308 | A | | 7/2009 | |
| JP | H03232210 | A | | 10/1991 | |
| JP | H0529137 | A | | 2/1993 | |
| JP | H09148122 | A | | 6/1997 | |
| JP | 2007234689 | A | | 9/2007 | |

OTHER PUBLICATIONS

E.C. Cannon et al., "An Investigation of Cooldown Strain in Potted Superconductive Magnets", Advances in Cryogenic Engineering Materials, Third Intl. Cryogenic Materials Conference, 1980, pp. 638-646.

* cited by examiner

*Primary Examiner* — Terrence Till
(74) *Attorney, Agent, or Firm* — Schiff Hardin LLP

(57) ABSTRACT

A superconducting electromagnet comprising coils of superconducting wire bonded to a support structure, and wherein heating elements are provided in thermal contact with the support structure for heating the support structure.

49 Claims, 5 Drawing Sheets

SUPERCONDUCTING ELECTROMAGNETS COMPRISING COILS BONDED TO A SUPPORT STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

The present preferred embodiment relates to superconducting electromagnets comprising coils of superconducting wire bonded to a support structure.

In particular, the preferred embodiment relates to improvements in such assemblies which reduce thermally-induced stresses between the coils and the support structure in cases of abrupt temperature changes to the assembly.

The present preferred embodiment particularly relates to electromagnets comprising essentially cylindrical assemblies of annular coils, aligned about a common axis, but displaced with respect to one another along that axis. Such arrangements are commonly referred to as solenoidal magnets, although they may not be solenoids in the strict sense of the word.

FIGS. 1-4 schematically illustrate certain arrangements of coils bonded to support structures as solenoidal magnets.

FIG. 1 shows a very well known, conventional arrangement in which coils 10 of superconducting wire are wound into annular cavities within a former 12. The structure essentially has 360 degree symmetry about the A-A axis, and also essentially has reflection symmetry about the plane B-B. The former is typically a turned aluminum tube in which annular channels are formed. In other less common variants, the former may be molded, or turned in a composite material such as glass fiber reinforced epoxy resin. In a typical manufacturing process, the coils 10 are impregnated with a hardening material, typically an epoxy resin, which bonds the wire in the coils together. The coils 10 are typically insulated from the former 12 on their radially inner surface (known as the A1 surface); the axially inner surface (known as the B1 surface) and the axially outer surface (known as the B2 surface) using materials to create slip planes between the coil and the former. These dimensions are defined with respect to the magnet center. In an alternative embodiment the coils may be bonded to the support structure on all faces.

Surfaces A1 and A2 are respectively at radii A1, A2 from axis A-A, and surfaces B1 and B2 are respectively at axial displacements B1, B2 from the plane B-B, as shown in FIG. 1. A so called 'central coil' is defined with respect to the B-B as symmetry plane as having B1=0 and B2 reflected by the symmetry plan. All other coils can be defined by B1 and B2 which are reflected in the symmetry plan.

FIG. 2 shows an alternative arrangement, in which such a former is not provided. Instead, coils 10 are bonded on their radially outer surface (known as the A2 surface) to a support structure 14, typically in an essentially cylindrical shape. This structure may be manufactured by winding the coils 10 into a mold, winding a filler material such as glass fiber cloth over the radially outer surface of the coils, and impregnating the whole structure with a hardening material such as an epoxy resin. The coils 10 are accordingly bonded to the support structure 14 only by their radially outer (A2) surfaces.

FIG. 3 shows another possibility. Here, coils 10 are wound between support elements 16. The coils 10 are bonded to the support elements 16, for example by a hardening material such as an epoxy resin. The coils 10 are accordingly bonded to the support structure comprising support elements 16 only by their axially inner (B1) and axially outer (B2) surfaces. Such a structure may be formed by temporarily attaching support elements 16 to a winding tube, winding coils 10 onto the winding tube between the support structures, and impregnating the coils 10 with a hardening material such as epoxy resin, which also serves to bond the coils 10 to the support elements 16.

The support elements 16 of FIG. 3 may be annular pieces of aluminum, composite material or any material which has suitable properties of mechanical strength, coefficient of thermal expansion, and density. Suitable materials include metals, typically, aluminum and stainless steel; composite materials such as those known under the Trademarks Tufnol and Durostone; various epoxy resins filled with either glass halls or cloth; or any other combination of materials which have suitable properties of mechanical strength, Young's modulus, and coefficient of thermal expansion.

FIG. 4 shows a partial cut-away view of a variant of the arrangement of FIG. 3, in which annular support elements 16 of FIG. 3 are replaced by support blocks 18, which are spaced circumferentially around the axial faces of the coils.

This structure may be manufactured by a process similar to that described for manufacturing the structure of FIG. 3, but in which spacer blocks (not shown) are positioned between the support blocks 18 to ensure the correct spacing of the support blocks, to support the winding of the coils, and to displace resin during the impregnation process. These spacer blocks may be removed from the structure after resin impregnation.

In this arrangement, the coils 10 are accordingly bonded to the support structure comprising support blocks 18 only by their axial inner (B1) and axial outer (B2) surfaces, and then only at circumferentially spaced locations.

The support blocks 18 of FIG. 4 may be pieces of aluminum, composite material or any material which has suitable properties of mechanical strength, coefficient of thermal expansion and density. Suitable materials include metals, typically, aluminum and stainless steel; or composite materials such as those sold under the trademarks Tufnol and Durostone; various epoxy resins filled with either glass balls or cloth; or any other combination of materials which have suitable properties of mechanical strength, Young's modulus, and coefficient of thermal expansion.

The coils 10 are made up of superconducting wire, which is typically made up of a matrix of NbTi filaments in a copper matrix. The turns of the wire are separated by a very thin layer of electrically insulating material, such as an epoxy resin. However, the thermal expansion coefficient and thermal conductivity of the coil are close to those of copper in the circumferential direction. In the radial and axial directions the thermal expansion coefficient is determined by a combination of the thermal expansion coefficients of the composite layers of wire and resin.

The materials of the support structure—for example aluminum or GRP (glass fiber reinforced plastic)—will have rather different thermal conductivities and thermal expansion coefficients. When the assembly of coils and support structure undergoes an abrupt change of temperature, the coils and the support structure will expand or contract to differing extents, and at differing rates. For materials with a relatively low thermal conductivity, the change in temperature will only take effect slowly, while temperature changes will take effect more rapidly for materials with a higher thermal conductivity. Furthermore, materials with a greater coefficient of thermal expansion will expand or contract as a result in the change of temperature to a greater extent than materials of lower thermal expansion coefficients.

As materials expand or contract with temperature, a value of strain may be defined as the proportion by which a dimension of the material changes. For example, if an object of length d changes length by Δd, the associated strain may be expressed as Δd/d.

The strain values for the different materials will be different even though their temperature changes may be similar.

In any of the coil assemblies described above, the strain in the coils will be different from the strain in the adjacent support structure. This risks damage to the bonded interfaces between coils and support structure because of a shear strain at the bonded interface. The resulting mechanical forces on the coils may risk a movement of the coils when in use, cracking at the interface of the coil bonded to the support structure, and bending of the coil causing stress and internal cracking, which may lead to a quench.

During a quench, the energy stored in the magnetic field of a superconducting magnet is suddenly dissipated into heat within the coils and magnet structure because of a disturbance to the superconducting state, typically caused by heat created by a mechanical interaction with the support structure or internal cracking of the resin within the coils, or over stressing the wire. Many known arrangements provide for the energy to be spread across several coils, following a quench in one coil. However, this will result in rapid heating of the coils, but the support structure bonded to the coils will not heat as quickly. This will result in a difference of surface strain between coil and support structure, risking damage to the bonds between coils and support structure.

In magnet structures such as shown in FIG. 1, with slip planes between the coils and the support structure the coils may be free to move independently of the support structure, and therefore damage between the coil and the former is restricted to stick slip issues. In magnet structures similar to that shown in FIG. 1 with the coils bonded to the former, damage to the bond between the coil and former may lead to a quench.

In magnet structures such as shown in FIG. 2, damage to the bond between coil 10 and support structure 14 may allow the coil some axial movement, which may in turn lead to a quench.

In magnet structures such as shown in FIG. 3 and FIG. 4, damage to the bond between coil 10 and support structure 16, 18 may damage the mechanical integrity of the structure as a whole, which is held together essentially only by bonds between coils and support elements. Damage to the bond may take the form of cracking which may result in the magnet quenching.

SUMMARY

It is an object to provide methods and apparatus for reducing the difference in interface strains between coils and adjacent support structures as the coils undergo an abrupt change in temperature. Examples of such changes in temperature include initial cooling of a magnet to operating temperature, and the heating of the magnet during a quench.

In a superconducting electromagnet, coils of superconducting wire are bonded to a support structure. A number of support blocks are positioned at circumferentially-spaced locations between adjacent coils. Electrically resistive heating elements are provided in thermal contact with the support blocks for heating the support blocks. In another embodiment, a former has annular cavities into which the coils are wound, and electrically resistive heating elements are provided in thermal contact with the former for heating the former. In another embodiment, coils of superconducting wire are bonded on the radially outer surface to a support structure of essentially cylindrical shape. Heating elements are provided in thermal contact with the essentially cylindrical support structure.

DESCRIPTION OF PREFERRED EXEMPLARY EMBODIMENTS

Figure 1:
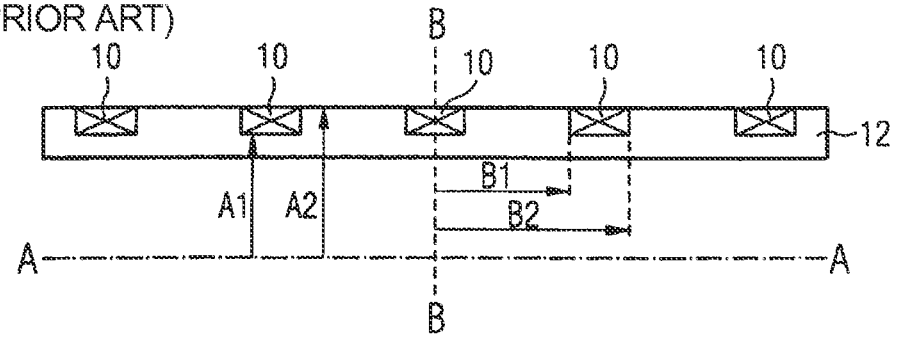
FIG 1 (PRIOR ART)
FIGS. 1-4 show examples of solenoidal superconducting electromagnets comprising coils bonded to support structures.
Figure 2:
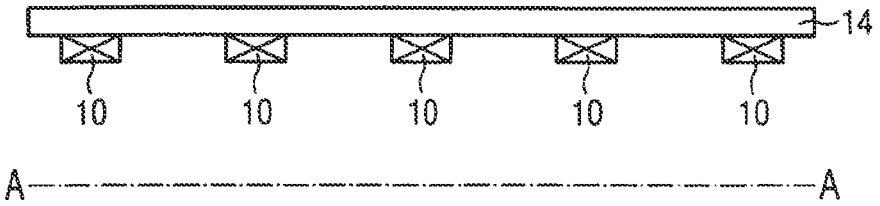
FIG 2 (PRIOR ART)
Figure 3:
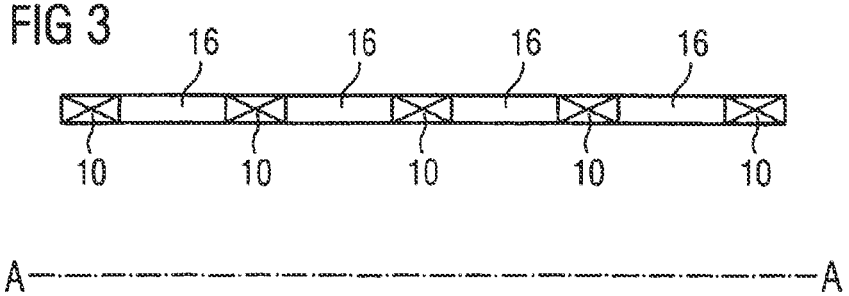

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included.

According to the present exemplary embodiments, heating elements are provided in thermal contact with the support structures, and are arranged to heat the support structure during abrupt transitions in temperature to reduce the difference in interface strain between the coils and the support structure.

In some embodiments, heating elements are also provided in thermal contact with the coils, and are arranged to heat the coils if required during abrupt transitions in temperature to reduce the difference in interface strain between the coils and the support structure.

The two most common events causing abrupt changes in temperature are quenches and initial cool down.

During quench, as described above, the coils will suddenly heat, and will tend to expand further and faster than the support structure, because of the energy dissipated in the coils due to the transition from the superconducting state to the resistive state, and the typically greater thermal expansion coefficient of the coils.

During initial cool down, the coils and support structure will contract at different rates, depending on the respective thermal conductivity and thermal expansion coefficients of the materials involved.

The eventual change in sizes of the coils and the support structure as a result of the change in temperature, and the resulting steady-state interface strains, will depend on the respective coefficients of thermal expansion of the coils and the support structure.

According to one exemplary embodiment, an arrangement is provided for heating the support structure to minimize the difference in surface interface strain between coils and support structure during the change in temperature of the coils.

According to one exemplary embodiment, this arrangement for heating the support structure will also minimize the internal stress of the coils, due to structural bending, during cool down and ramping, thus reducing one of the causes of cracking of the epoxy resin within the coils.

In one embodiment of the present invention, a resistive conductor, such as a length of wire, is provided within, or on the surface of, the support structure for use as a heating element. The particular arrangement will depend on the materials used for the support structure. For example, if the support structure is of a composite material such as GRP, it is relatively simple to embed a resistive wire into the support structure as it is manufactured. On the other hand, if the support structure is made of aluminum, it may be more practical to attach a resistive wire to the surface of the support structure, in such a way that it is electrically isolated from the aluminum support structure, and in thermal contact with it.

In certain embodiments, the resistive conductors are arranged to carry a proportion of the current flowing in the coils, by appropriate connection to a quench protection circuit.

Figure 5:
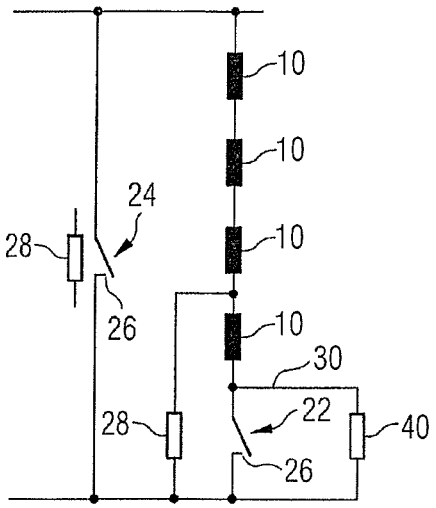
FIG. 5 shows an example of a conventional quench protection circuit.

FIG. 5 shows one example of a typical quench protection circuit as provided in known superconducting magnets, which may be employed in an embodiment of the present invention. Coils 10 are connected in series, through two superconducting switches, 22 and 24. Each superconducting switch includes a length of superconducting switch wire, schematically represented at 26, and a switch heater represented at 28. In use, switch 22 is in its closed state. The superconducting wire 26 of the switch 22 is cooled to below its superconducting transition temperature by the refrigeration arrangements applied to the coils 10. No power is supplied to the heater 28 of the switch 22 as it is bypassed by a superconducting coil and a superconducting switch in its closed state. Superconducting switch 24 is used to control introduction of current into the magnet coils 10 and removal of current from the magnet coils 10. If current is to be introduced or removed, power is supplied to the switch heater 28. This quenches the switch wire 26 and allows an external magnet power supply unit (not shown) to introduce or remove current from the coils 10 as required. Once the desired current level is reached, power to the switch heater 28 is removed, the switch wire 26 cools to below its transition temperature, and the superconducting circuit is completed.

If a quench occurs in a coil 10 while current is flowing through it, a voltage will appear across that coil. The current flowing through it will begin to drop, and opposing voltages will appear across the other coils. These voltages will cause a voltage to appear across the switch heater 28, and power will be supplied to switch heater 28. This will cause the switch wire 26 to quench, becoming resistive. A voltage will appear across the switch wire 26, and some current will be diverted through connection 30 to the heating arrangement 40 of the present exemplary embodiment. As is conventional, some current will also be provided to quench heaters (not shown) thermally linked to the coils 10. This current will heat any unquenched coils, causing them all to quench, so spreading out the heating caused by the quench and protecting the original quenching coil from overheating. By connecting heaters of the present exemplary embodiment to the quench protection circuit, the support structure may be heated and the difference in the interface strain between coils and support structure may be reduced, thus reducing the risk of damage due to a quench.

Figure 6:
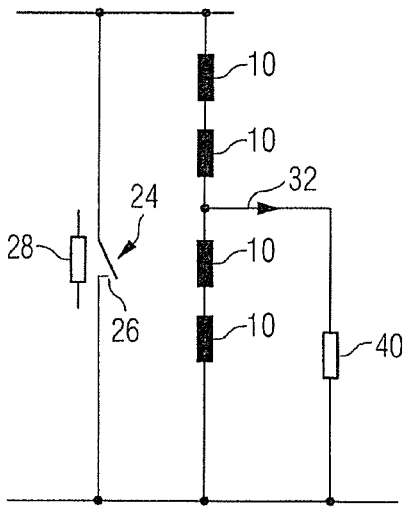
FIG. 6 shows another example of a conventional quench protection circuit.

FIG. 6 shows an alternative, somewhat simpler, arrangement. Here, only one superconducting switch 24 is provided, for use when introducing current into, or removing current from, the coils 10. In the case of a quench occurring in any one of the coils 10, that coil will suddenly become resistive and a voltage difference will appear across that coil. Opposing voltages will appear across the other coils, as the inductive coils oppose the reduction in current caused by the quenched coil. A voltage will accordingly appear at the output 32, which may be employed to power a heating arrangement 40 provided according to the present preferred embodiment. As is conventional, some current will also be provided to quench heaters (not shown) thermally linked to the coils 10. This current will heat any unquenched coils, causing them all to quench, thus sharing the dissipation of the stored energy caused by the quench across all of the magnet coils, and thus protecting the originally quenching coil from overheating. By connecting heating elements of the present exemplary embodiment to the quench protection circuit, the support structure may be heated and the difference in interface strain between coils and support structure may be reduced, reducing the risk of damage due to a quench.

In another application of the present invention, heating elements may be employed to heat a supporting structure to reduce a difference in surface strains during quench on conventional magnet end-coils, which are supported by their radial outer surfaces.

Figure 7:
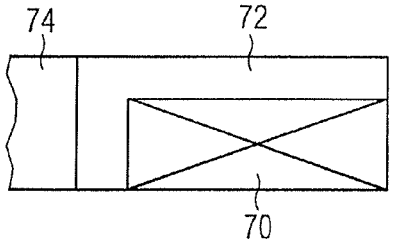
FIG. 7 shows an axial part-cross section through an 'end' coil 70 of the conventional construction.

FIG. 7 shows an axial part-cross section through an 'end' coil 70 of conventional construction. In such a conventional arrangement, the end coil is supported on its axially inner (B1) surface and radially outer (A2) surface by a support ring 72 attached to the remainder of a coil support structure 74. The coil is not bonded to the support structure, but has layers of material between the coil and the support, which form slip planes allowing the coil to move relative to the support structure. In use, such end coils have a tendency to expand due to hoop stresses caused by the interaction of the magnetic field generated by the end coil and with the magnetic field generated by the remainder of the magnet.

Figure 8:
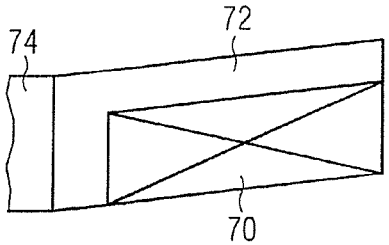
FIG. 8 shows the structure of FIG. 7, deformed due to expansion of the end coil.

In the event of a quench occurring in end coil 70, the coil will suddenly heat and expand. The increase in diameter caused by this expansion will press against the support ring 72 as shown in FIG. 8, causing deformation of the coil and the support ring. Such deformation may cause mechanical damage to the structure of the coil, for example by breaking resin bonds between turns of the coil 70.

Such expansion of the coil may also cause the support structure to yield, causing permanent deformation of the support ring and result in incorrectly supported coil 70, in turn causing the coil to quench because of large coil movement.

In one exemplary embodiment of the present invention, a heating arrangement is provided in thermal contact with the support ring 72. In case of a quench, the heating arrangement heats the support ring and causes it to expand more rapidly than would otherwise occur, reducing the difference in strain between the end coil 70 and the support ring 72.

Figure 4:
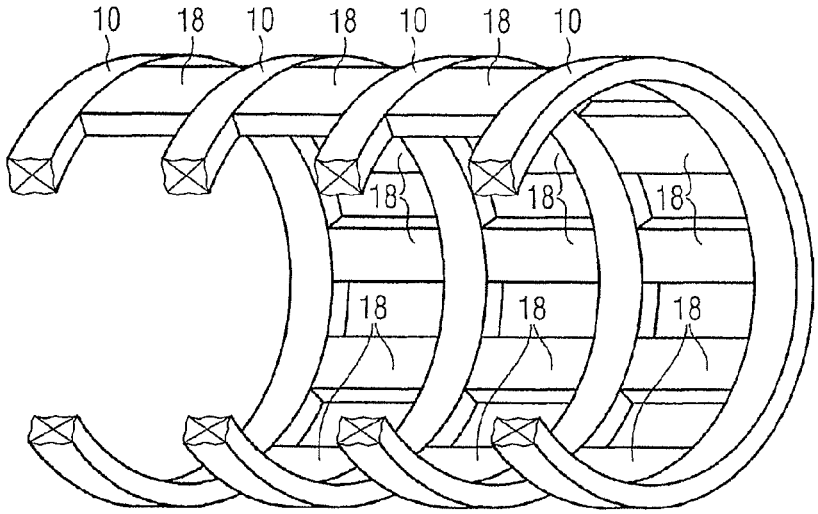
Figure 4A:
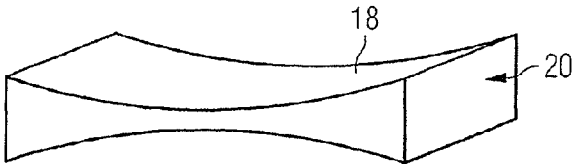
FIG. 4A shows profiled support segments which may be employed in certain embodiments of the invention.

The following calculation illustrates that sufficient energy may be derived from a typical magnet such as illustrated in FIG. 4 to heat the support structure 18 to a temperature which results in a thermal strain similar to the thermal strain reached by the coils, in a similar time, thereby reducing the shear stress between the coil and the support structure, according to an embodiment of the present invention.

The heat Q, required to increase the temperature of the support structure, 18 can be calculated from the change in enthalpy from the initial to the final temperature of the material, for a given mass m. The change in enthalpy is calculated from the integral of the specific heat capacity, $C_p$, over the temperature change:

$$Q = m\int_{T_1}^{T_2} C_p\, dT = m[H(T_2) - H(T_1)],$$

where m is the total mass of the structure, T1 and T2 are the initial and final temperatures, respectively, and H(T) is the enthalpy of the relevant material at temperature T, which is the integral of the heat capacity.

The electrical energy stored in a typical 3 Tesla superconducting magnet is about 12MJ and a fraction of this electrical stored magnet energy can be extracted from the magnet and made available to heat the support structure 18.

Given the coil quench temperature change, the coefficients of thermal expansion, the mass of the support structure, and the enthalpy change during quench, the energy required to minimize the differential thermal strain can be optimized for specific magnet designs and coil quench scenarios, and heater elements designed and provided to ensure differential surface strain minimization.

Certain examples of heater elements according to certain exemplary embodiments of the present invention will now be described, by way of examples.

Figure 9:
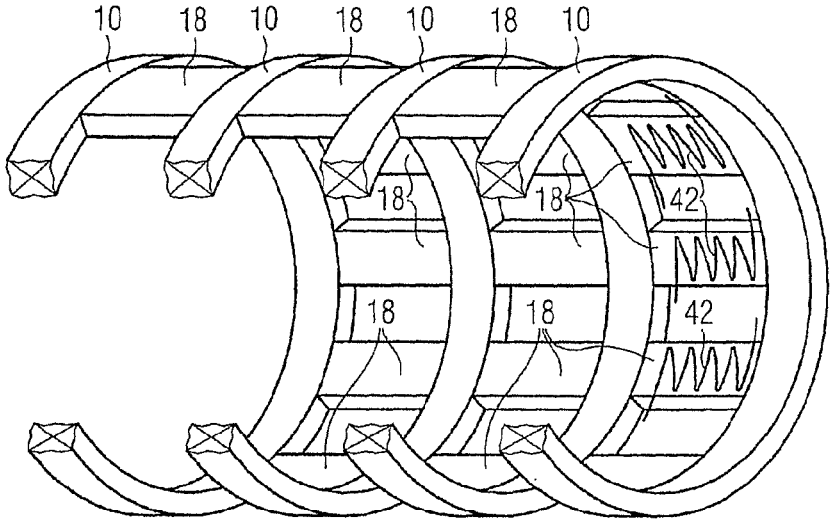
FIGS. 9-12 show example arrangements of heating elements bonded to support structures, according to certain embodiments of the present invention.
Figure 10:
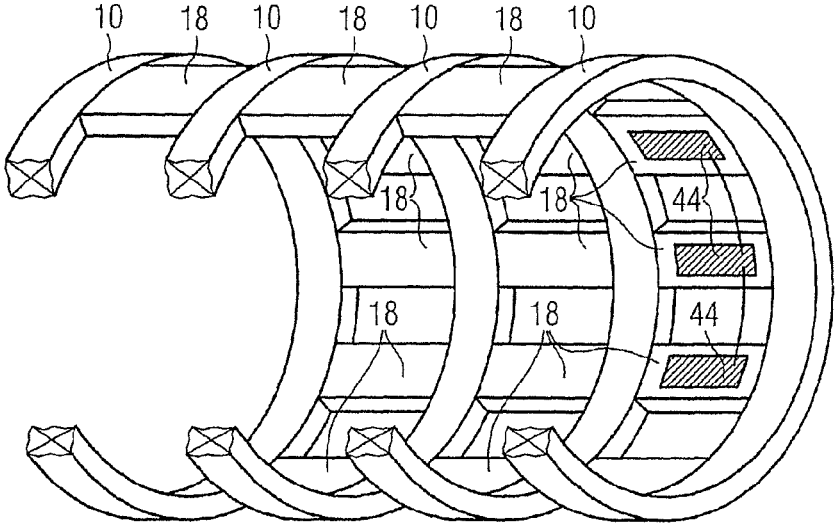

In the example of FIG. 9, for heating of a segmented support structure by the magnet current, as in the examples discussed above, the support structure segments 18 are each provided with a heater element 42 formed by a resistive wire wound into or onto each segment. Alternatively, as illustrated in FIG. 10 a resistive heater 44 may be bolted or otherwise attached to the support structure 18, which acts as a heat sink. Upon quenching, a percentage of the coil current is diverted into these resistive wires or heaters, using circuits such as illustrated in FIGS. 5 and 6. The resulting ohmic heating heats the support structure 18 and provides the energy required to create the required strain in the support structure.

Figure 11:
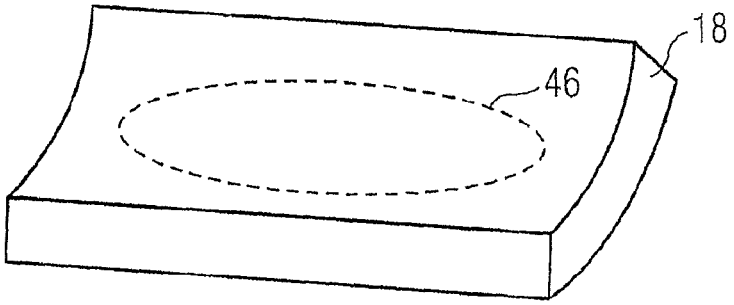

In an alternative arrangement shown in FIG. 11, the heating elements provided for heating the support structure 18 are not electrically connected to the quench protection circuit or to the coils of the magnet structure. The heating elements 46 for the support structure 18 are each formed by an electrically shorted closed loop of wire wound into the support 18. Upon quenching, the changing magnetic field inductively couples to this closed circuit within the support structure, thus inducing eddy currents and resistive heating of the support structure. This closed loop inductive circuit 46 is designed to create the required heating and therefore strain in the support structure by appropriate selection of conductivity, and thermal expansion of the composition of which the support structure is constructed, as compared to the energy to the structure by the resistive heating provided by the inductive coils.

Figure 12:
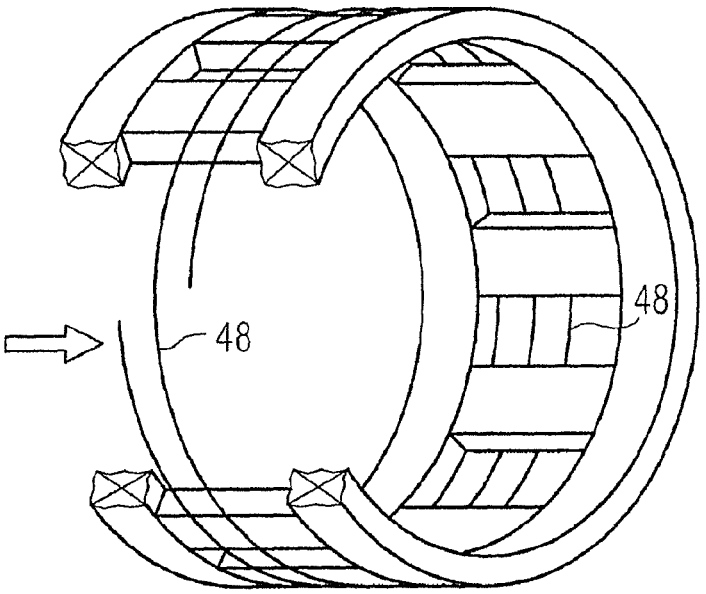

FIG. 12 shows another alternative, where resistive wire 48 is wound circumferentially around the whole support structure between adjacent coils.

For a support structure that is bonded to two coils, the electrical circuit within the structure can be varied along its length to compensate for any differences in the strain of the two coils. Similarly the distribution of resistive wire 42 or resistive heaters 44 may be adapted to provide the required strain adjacent to each coil. The idea can be applied to any or all of the axial, radial and hoop strains.

The problem of different thermal strain between the coils 10 and the support structure 18 also occurs when a superconducting magnet is cooled from room temperature to low temperature, to induce the transition in the NbTi filaments from a resistive to a superconducting state, in preparation for the introduction of current into the coils. This is particularly true in cases where the magnet is pre-cooled by addition of a sacrificial cryogen such as nitrogen, in preparation for the addition of liquid helium, as cooling takes place very rapidly. The problem may also occur in arrangements in which the magnet is cooled more slowly, for example by operation of a cryogenic refrigerator. The different rates of thermal contraction of the different materials, due to differences in both coefficients of thermal expansion and thermal conductivity, can result in high mechanical stresses at interfaces between coils 10 and support structure 18 during cooling. A solution to this is to control the cool down rate of the support structure and the coils by using a heater within each of these materials. These heaters cannot be powered by inductive coupling to the magnet, as there will be no changing magnetic field from the superconducting magnet during the cooling of the magnet. Rather, the heaters must be powered by electrical connection to the magnet or a suitably adapted separate quench protection circuit, or to a circuit provided for this specific purpose during the cool down process.

Spacers of similar form to the aluminum spacers 18 described above may be constructed of resin-impregnated coils of aluminum, stainless steel or copper. These coils may be electrically connected together and connected to a quench circuit or a circuit for providing current during a cool-down phase. Alternatively, the coils in the spacers may be electrically short circuited to form conductive loops, which inductively couple with a diminishing magnetic field during a quench event, such that electric current is induced in the coils during a quench event, thereby heating the spacers. Alternatively, or in addition, the spacers may be arranged to receive electrical power inductively from a diminishing magnetic field of the superconducting magnet during a quench. For this purpose, a number of the spacers may be electrically connected in series, or the coil in each spacer may be short-circuited into a closed loop.

According to one present exemplary embodiment, heating is provided to a support structure retaining superconducting coils such that both the coils and the adjacent support structure have a similar strain during quench, and also or alternatively during the cool-down phase in certain embodiments of the invention. In embodiments of the present invention, consideration should be given to the thermal conductivity and thermal expansion coefficient of the spacers, not only to the mechanical strength and tolerance of cryogenic temperatures of the material used for the support structure.

While the present exemplary embodiments have been described with particular reference to embodiments in which the superconducting coils are annular, the present embodiments may be applied to superconducting electromagnets having coils of any shape.

The present exemplary embodiments may be applied to a support structure of a conductive material such as aluminum, and to a support structure of non-conductive materials such as glass fiber reinforced plastic composite.

While the present exemplary embodiments have been described with reference to certain types of support structure, the present invention may usefully be applied to any superconducting magnet structure in which coils are bonded to a support structure.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim:

1. A superconducting electromagnet, comprising:

coils of superconducting wire bonded to a support structure comprising a number of support blocks positioned at circumferentially-spaced locations between adjacent coils; and electrically resistive heating elements provided in thermal contact with the support blocks for heating the support blocks.

2. The superconducting electromagnet according to claim 1 wherein the heating elements include closed loops of wire arranged to receive energy by electrical induction during a change in magnetic field strength produced by the electromagnet.

3. The superconducting electromagnet according to claim 1 wherein the heating elements comprise electrical resistors mechanically mounted on the support structure and provided with electrical connections to thereby receive electrical energy when required to heat the support structure.

4. The superconducting electromagnet according to claim 1 wherein the heating elements comprise coils of resistive wire mechanically mounted on or in the support structure and provided with electrical connections to thereby receive electrical energy when required to heat the support structure.

5. The superconducting electromagnet according to claim 3 wherein the heating elements are connected to a quench protection circuit to thereby receive electrical energy in case of a quench of the electromagnet.

6. The superconducting electromagnet according to claim 2 wherein the closed loops are arranged such that in case of a quench of the electromagnet a changing magnetic field of the electromagnet induces current in the closed loops thereby causing ohmic heating of the closed loops and so also of the support structure.

7. The superconducting electromagnet according to claim 1 wherein the support structure is of an electrically non-conducting material.

8. The superconducting electromagnet according to claim 1 wherein the support structure is of an electrically conducting material.

9. The superconducting electromagnet according to claim 2 wherein the loops or coils of wire are each placed in a hole or cavity formed in the support structure, the hole or cavity being filled with a hardening material.

10. The superconducting electromagnet according to claim 1 wherein a source of electrical power is made available to heat the support structure during a cool-down phase of operation of the superconducting electromagnet.

11. The superconducting electromagnet according to claim 1 wherein the support structure comprises a support ring retaining one of the coils on a radially outer surface thereof, and at least one of the electrically resistive heating elements is arranged for heating the support ring.

12. A superconducting electromagnet, comprising:

coils of superconducting wire bonded to a support structure comprising a former having annular cavities into which the coils are wound; and electrically resistive heating elements in thermal contact with the former for heating the former.

13. The superconducting electromagnet according to claim 12 wherein the heating elements include closed loops of wire arranged to receive energy by electrical induction during a change in magnetic field strength produced by the electromagnet.

14. The superconducting electromagnet according to claim 12 wherein the heating elements comprise electrical resistors mechanically mounted on the support structure and provided with electrical connections to thereby receive electrical energy when required to heat the support structure.

15. The superconducting electromagnet according to claim 12 wherein the heating elements comprise coils of resistive wire mechanically mounted on or in the support structure and provided with electrical connections to thereby receive electrical energy when required to heat the support structure.

16. The superconducting electromagnet according to claim 14 wherein the heating elements are connected to a quench protection circuit to thereby receive electrical energy in case of a quench of the electromagnet.

17. The superconducting electromagnet according to claim 13 wherein the closed loops are arranged such that in case of a quench of the electromagnet a changing magnetic field of the electromagnet induces current in the closed loops thereby causing ohmic heating of the closed loops and so also of the support structure.

18. The superconducting electromagnet according to claim 12 wherein the support structure is of an electrically non-conducting material.

19. The superconducting electromagnet according to claim 12 wherein the support structure is of an electrically conducting material.

20. The superconducting electromagnet according to claim 13 wherein the loops or coils of wire are each placed in a hole or cavity formed in the support structure, the hole or cavity being filled with a hardening material.

21. The superconducting electromagnet according to claim 12 wherein a source of electrical power is made available to heat the support structure during a cool-down phase of operation of the superconducting electromagnet.

22. The superconducting electromagnet according to claim 12 wherein the support structure comprises a support ring retaining one of the coils on a radially outer surface thereof, and at least one of the electrically resistive heating elements is arranged for heating the support ring.

23. A superconducting electromagnet, comprising:

coils of superconducting wire bonded on their radially outer surface to a support structure of essentially cylindrical shape; and heating elements in thermal contact with the essentially cylindrical support structure.

24. The superconducting electromagnet according to claim 23 wherein the heating elements include closed loops of wire arranged to receive energy by electrical induction during a change in magnetic field strength produced by the electromagnet.

25. The superconducting electromagnet according to claim 23 wherein the heating elements comprise electrical resistors mechanically mounted on the support structure and provided with electrical connections to thereby receive electrical energy when required to heat the support structure.

26. The superconducting electromagnet according to claim 23 wherein the heating elements comprise coils of resistive wire mechanically mounted on or in the support structure and provided with electrical connections to thereby receive electrical energy when required to heat the support structure.

27. The superconducting electromagnet according to claim 25 wherein the heating elements are connected to a quench protection circuit to thereby receive electrical energy in case of a quench of the electromagnet.

28. The superconducting electromagnet according to claim 24 wherein the closed loops are arranged such that in case of a quench of the electromagnet a changing magnetic field of the electromagnet induces current in the closed loops thereby causing ohmic heating of the closed loops and so also of the support structure.

29. The superconducting electromagnet according to claim 23 wherein the support structure is of an electrically non-conducting material.

30. The superconducting electromagnet according to claim 23 wherein the support structure is of an electrically conducting material.

31. The superconducting electromagnet according to claim 24 wherein the loops or coils of wire are each placed in a hole or cavity formed in the support structure, the hole or cavity being filled with a hardening material.

32. The superconducting electromagnet according to claim 23 wherein a source of electrical power is made available to heat the support structure during a cool-down phase of operation of the superconducting electromagnet.

33. The superconducting electromagnet according to claim 23 wherein the support structure comprises a support ring retaining one of the coils on a radially outer surface thereof, and at least one of the electrically resistive heating elements is arranged for heating the support ring.

*34. A superconducting electromagnet, comprising:*

*coils of superconducting wire bonded to a support structure comprising an annular support element positioned between adjacent coils; and*

*at least one electrically resistive heating element provided in thermal contact with the annular support element for heating the support element.*

*35. The superconducting electromagnet according to claim 34 wherein the heating element comprises closed loops of wire arranged to receive energy by electrical induction during a change in magnetic field strength produced by the electromagnet.*

*36. The superconducting electromagnet according to claim 34 wherein the heating element comprises an electrical resistor mechanically mounted on the support structure and provided with electrical connections to thereby receive electrical energy when required to heat the support structure.*

*37. The superconducting electromagnet according to claim 34 wherein the heating element comprises a coil of resistive wire mechanically mounted on or in the support structure and provided with electrical connections to thereby receive electrical energy when required to heat the support structure.*

*38. The superconducting electromagnet according to claim 36 wherein the heating element is connected to a quench protection circuit to thereby receive electrical energy in case of a quench of the electromagnet.*

*39. The superconducting electromagnet according to claim 35 wherein the closed loops are arranged such that in case of a quench of the electromagnet a changing magnetic field of the electromagnet induces current in the closed loops thereby causing ohmic heating of the closed loops and so also of the support structure.*

*40. The superconducting electromagnet according to claim 34 wherein the support structure is of an electrically non-conducting material.*

*41. The superconducting electromagnet according to claim 34 wherein the support structure is of an electrically conducting material.*

*42. The superconducting electromagnet according to claim 35 wherein the loops of wire are each placed in a hole or cavity formed in the support structure, the hole or cavity being filled with a hardening material.*

*43. The superconducting electromagnet according to claim 34 wherein a source of electrical power is made available to heat the support structure during a cool-down phase of operation of the superconducting electromagnet.*

*44. The superconducting electromagnet according to claim 34 wherein the support structure comprises a plurality of said annular support elements with a respective one of said support elements being positioned between respective adjacent coils.*

*45. A superconducting electromagnet, comprising:*

*coils of superconducting wire bonded to a support structure; and*

*an electrically resistive heating element in thermal contact with the support structure.*

*46. A superconducting electromagnet, comprising:*

*a plurality of annular coils of superconducting wire which are arranged in an axial direction, each of said annular coils having spaced apart axial surfaces;*

*an annular support element positioned between and bonded to the adjacent axial surfaces of adjacent ones of said annular coils of superconducting wire for supporting said annular coils; and*

*a plurality of said annular support elements being provided with a respective one of each of said support elements being positioned between respective coils.*

*47. The superconducting electromagnet according to claim 46 wherein the annular support elements each comprise a plurality of support blocks arranged apart from one another in a circumferential direction between the adjacent annular coils.*

*48. A superconducting magnet, comprising:*

*a plurality of annular coils of superconducting wire which are arranged in an axial direction, each of said annular coils having spaced apart axial surfaces;*

*an annular support element positioned between and bonded to the adjacent axial surfaces of adjacent ones of said annular coils of superconducting wire for supporting said annular coils; and*

*the annular coils being bonded to the annular support element only by said axial surfaces.*

*49. A superconducting electromagnet according to claim 48 wherein the annular support element comprises a plurality of support blocks arranged apart from one another in a circumferential direction between the adjacent annular coils.*

* * * * *